Nov. 5, 1935.　　O. WITTEL　　2,019,753
TRIPOD LEG CONSTRUCTION
Filed July 21, 1933
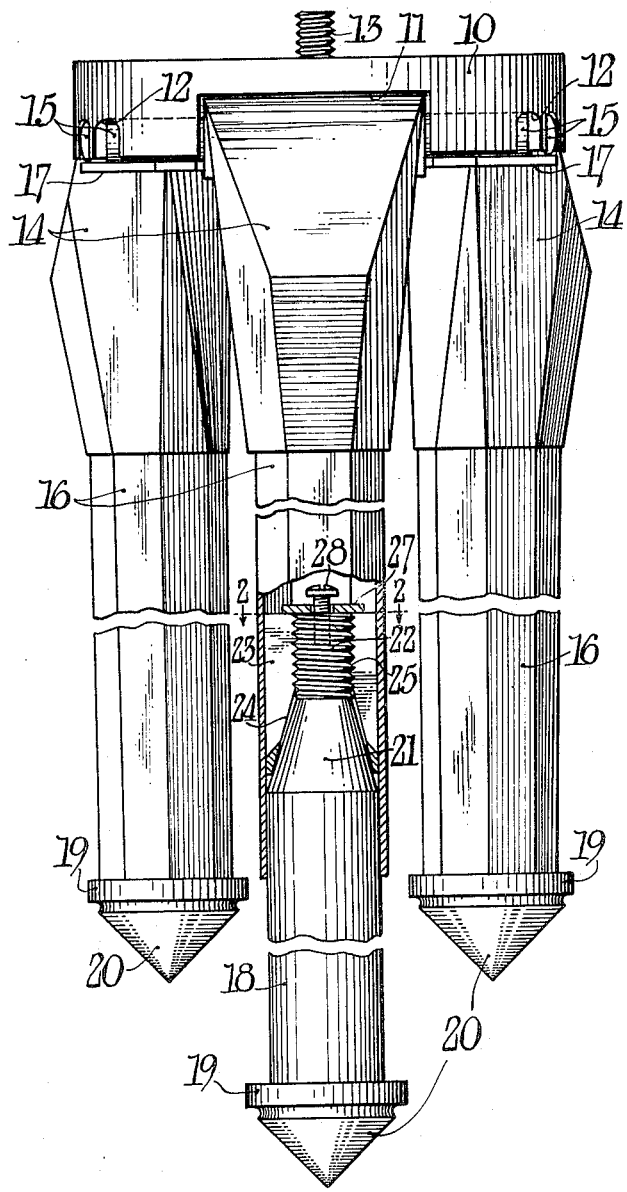
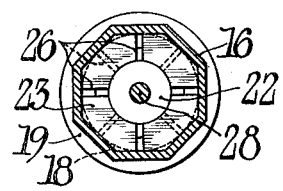
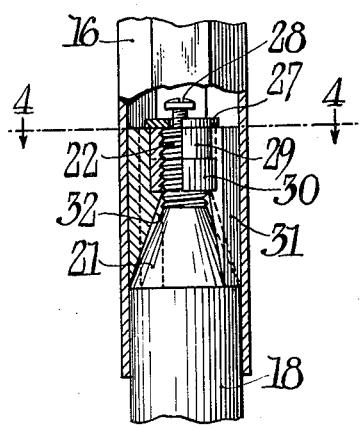
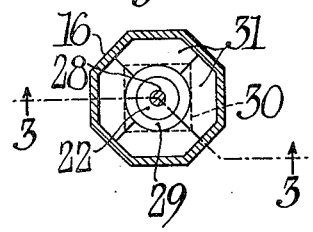
Otto Wittel, Inventor;

Patented Nov. 5, 1935

2,019,753

UNITED STATES PATENT OFFICE 2,019,753

TRIPOD LEG CONSTRUCTION

Otto Wittel, Rochester, N. Y., assignor to Eastman Kodak Company, Rochester, N. Y., a corporation of New York Application July 21, 1933, Serial No. 681,510

5 Claims. (Cl. 248—191)

The present invention relates to improvements in a tripod leg construction and more particularly to a leg construction comprising telescopic tubes which may be readily adjusted to various relative axial positions.

It has been previously pro... ed to provide a clamping arrangement for tripod legs, comprising telescopic cylindrical tubes, which arrangement includes a clamp member operated upon relative rotation of the cylindrical tubes to clamp the tubes with respect to each other in any desired axial relation. The formerly proposed clamp member includes a split nut and a tapered member for splitting the nut against the inner walls of one of the cylindrical tubes. Since the clamp member is operated by relative rotation between one of the tubes and the split nut and, since the nut and the tube engaged by it are of circular cross-section, the prohibition of relative rotatable movement between these members depends solely upon a frictional engagement between the inner walls of the tube and the outer surface of the split nut. Consequently, the operation of the clamping member is not positive and may be delayed by slippage between the contacting surfaces of the tube and split nut.

The primary object of the present invention is the provision in a tripod leg construction of a clamp member which is movable frictionally to engage the inner walls of a tube and in which the clamp member and contacted tube have a cross-section, such that relative rotation between the tube and clamp member is prohibited.

Another object of the present invention is the provision in a tripod leg construction of a clamp member which is composed of individual segments so that the clamp member may be readily assembled.

Other and further objects of the invention will be suggested to those skilled in the art by the disclosure which follows.

The above and other objects of the invention are obtained by the provision of a tripod leg comprising a pair of telescopic tubes and including a clamp member threaded to the end of the inner tube and adapted to engage the inner walls of the outer tube upon relative rotation between the clamp member and the inner tube, the cross-sections of the inner walls of the outer tube and of the outer walls of the clamp member being such that there can be no relative rotatable movement between them.

Reference is hereby made to the accompanying drawing in which similar reference characters designate similar elements and in which:

Figure 1 is a side elevation of a tripod with a section broken away to illustrate the formation of the outer telescopic tube and of the clamp member according to the present invention.

Figure 2 is a transverse cross-section through a tripod leg taken on the line 2—2 of Figure 1.

Figure 3 is a sectional view of a modified and preferred form of clamp member construction taken on the line 3—3 of Figure 4.

Figure 4 is a transverse cross-section through the preferred form of leg construction taken on the line 4—4 of Figure 3.

In the illustrated embodiment of the present invention, the tripod comprises a tripod head 10 which is provided with a plurality of recesses 11 and with a plurality of grooves 12. A bolt 13 extends through the tripod head 10 in a known manner and is employed for the attachment of the apparatus to be supported by the tripod.

The legs of the tripod are preferably composed of telescopic tubes which are attached to tripod head 10 in the following manner. Each tripod leg has a header 14 which includes a trunnion 15 and which is provided with a recess for the reception of the outer telescopic tube 16. The trunnions 15 are located within the grooves 12 of tripod head 10 and are all held in place by a single plate 17 which is secured to the bottom of tripod head 10 in any suitable manner. The manner of connecting the tripod legs to the tripod head is extremely simple and facilitates manufacture and assemblage of the tripod but does not constitute any part of the present invention.

The outer tube 16 of the leg construction is illustrated as having an octagonal cross-section and the inner tube 18 as having a circular cross-section corresponding to the inscribed circle for the octagonal cross-section of tube 16. The lower ends of inner tubes 18 are provided with knurled collars 19 and inverted cones 20.

The upper ends of inner tubes 18 each have a tapered portion 21 which is preferably conical and each have a threaded portion 22.

The clamp member of the invention is attached to but split by the tapered portion 21 of inner tube 18 and may be composed of a split nut 23 which is provided with a tapered recess 24, which is provided with a threaded hole 25 adapted to engage threaded portion 22 of inner tube 18 and which is provided with a plurality of staggered longitudinal slits 26 for rendering the split nut 23 resilient.

Washer 27 is loosely mounted upon the end of threaded portion 22 on inner tube 18 by means of a bolt 28.

It is clear that rotation of inner tube 18 will result in relative axial movement between the tapered portion 21 and the tapered recess 24 of the clamp member so that the outer walls of split nut 23 are spread frictionally to engage the inner walls of outer tube 16. The spreading of the split nut 23 is rendered more positive and certain if there can be no relative rotation between the split nut 23 and the outer tube 16. As before indicated, the outstanding feature of the present invention is the recognition that the action of the clamp member is rendered more positive by providing the outer tube 16 on the split nut 23 with cooperating surfaces of an outline such that the members may slide in an axial direction with respect to each other but can not be relatively rotated. In the illustrated embodiment, the inner walls of outer tube 16 and the outer walls of split nut 23 are shown as having an octagonal cross-section, see Figure 2. However, it is within the scope of the invention to provide these members with cooperating surfaces of any form to accomplish the asserted purpose and it is not necessary that the sections of the two members be similar.

The clamp member, as shown in Figures 1 and 2, is composed of a single member. However, it is preferred to make up the clamp member from a plurality of individual segments as shown and described in connection with Figures 3 and 4. The outer tube 16, as before, has an octagonal formation. The inner tube 18 also is cylindrical being provided with a tapered portion 21 and a threaded portion 22. The washer 27 is loosely attached to the end of threaded portion 22 by said bolt 28. In place of split nut 23, a nut 29 is threaded to bolt 22 and is provided with shoulders 30, while a plurality of segments 31 are adapted to slide within outer tube 16 and to engage the shoulders 30 of nut 29. The segments 31 may be manufactured from any suitable material but hard rubber, or fibrous compositions are preferred, so that the inner walls of outer tube 16 will not be scored by the corners on segments 31. The clamping action between the tubes 16 and 18 takes place upon relative rotation therebetween and so that the tubes 16 and 18 may be clamped in any desired axial position with respect to each other. Upon relative rotation between tubes 16 and 18, the threaded portion 22 is drawn into nut 29 so that tapered portion 21 engages the tapered recess 32 formed by segments 31 and the outer walls of segments 31 are tightly pressed against the inner walls of outer tube 16. Any relative movement between nut 29 and segments 31 is prevented by the shoulder 30.

Since the clamping arrangement between the tubes of the leg construction is susceptible of many alterations, the present disclosure is to be construed in an illustrative sense. The cross-sections or contours of the cooperating surfaces of one of the tubes and/or the clamp member may vary widely and still accomplish the purpose of preventing relative rotation between the tube and clamp member. The scope of the present invention is to be limited only by the appended claims.

Having now particularly described my invention, what I desire to secure by Letters Patent of the United States, and what I claim is—

1. In a tripod leg, the combination with a hollow leg member having non-circular internal walls, a second leg member longitudinally and rotatably movable within said hollow leg member, and a wedge member mounted on one end of said second leg member within said hollow leg member, of a clamping means adapted upon relative axial movement with respect to said wedge member to be expanded thereby frictionally to engage the internal walls of said hollow leg member, longitudinally movable within said hollow leg member, and having non-circular external walls arranged positively to engage said internal walls of the hollow leg member for positively prohibiting relative rotational movement with respect to said hollow leg member, and means for moving said wedge member axially with respect to said clamping means to expand the same upon relative rotational movement therebetween.

2. In a tripod leg, the combination with a hollow leg member provided with an internal duct of polygonal cross section, a second leg member longitudinally and rotatably movable within the duct of said hollow leg member, and a wedge member mounted on one end of said second leg member within said hollow leg member, of a clamping means adapted upon relative axial movement with respect to said wedge member to be expanded thereby frictionally to engage the interior of said hollow leg member, and having an external contour arranged to cooperate with the polygonal duct and to permit relative longitudinal movement but to prohibit relative rotational movement with respect to said hollow leg member, and means for moving said wedge member axially with respect to said clamping means to expand the same upon relative rotational movement therebetween.

3. In a tripod leg, the combination with a hollow leg member provided with an internal duct of polygonal cross section, a second leg member longitudinally and rotatably movable within the duct of said hollow leg member, and a wedge member mounted on one end of said second leg member within said hollow leg member, of a clamping means adapted upon relative axial movement with respect to said wedge member to be expanded thereby frictionally to engage the interior of said hollow leg member, and having a polygonal cross section arranged to cooperate with the polygonal duct and to permit relative longitudinal movement but to prohibit relative rotational movement with respect to said hollow leg member, and means for moving said wedge member axially with respect to said clamping means to expand the same upon relative rotational movement therebetween.

4. In a tripod leg, the combination with a hollow leg member provided with an internal duct of polygonal cross section, a second leg member longitudinally and rotatably movable within the duct of said hollow leg member, and a wedge member mounted on one end of said second leg member within said hollow leg member, of a clamping means adapted upon relative axial movement with respect to said wedge member to be expanded thereby frictionally to engage the interior of said hollow leg member, and having a polygonal cross section similar to the cross section of the internal duct of the hollow leg member and arranged to cooperate with that polygonal duct and to permit relative longitudinal movement but to prohibit relative rotational movement with respect to said hollow leg member, and means for moving said wedge member axially with respect to said clamping means to expand the same upon relative rotational movement therebetween.

5. In a tripod leg, the combination with a hollow leg member provided with an internal duct of polygonal cross section, a second leg member longitudinally and rotatably movable within the duct of said hollow leg member, and a conical member on one end of said second leg member within the duct of said hollow leg member, of a clamping means provided with a conical bore engaged by said conical member, expanded by relative axial movement with respect to said conical member frictionally to engage the interior of said hollow leg member, and having an external contour arranged to cooperate with the polygonal duct and to permit relative longitudinal movement but to prohibit relative rotational movement with respect to said hollow leg member, and means for moving said conical member axially with respect to said clamping means upon relative rotation therebetween.

OTTO WITTEL.